United States Patent [19]

Giori et al.

[11] Patent Number: 4,703,084

[45] Date of Patent: Oct. 27, 1987

[54] THERMOPLASTIC COMPOSITIONS CONTAINING NITRILE RUBBER

[75] Inventors: Claudio Giori, Riverwoods; Stamatios G. Mylonakis, Barrington, both of Ill.

[73] Assignee: Borg-Warner Chemicals, Inc., Parkersburg, W. Va.

[21] Appl. No.: 867,721

[22] Filed: May 28, 1986

[51] Int. Cl.$^4$ .......................... C08L 9/00; C08L 9/02; C08L 51/04

[52] U.S. Cl. .......................................... 525/87; 525/86

[58] Field of Search ................................... 525/87, 86

[56] References Cited

U.S. PATENT DOCUMENTS

| | | | |
|---|---|---|---|
| 2,439,202 | 4/1948 | Daly | 260/45.5 |
| 2,505,349 | 4/1950 | Daly | 260/45.5 |
| 2,550,139 | 4/1951 | Daly | 260/45.5 |
| 3,499,059 | 3/1970 | Molan et al. | 252/87 |
| 3,816,563 | 8/1974 | Mathews et al. | 525/87 |
| 4,157,361 | 6/1979 | Cornell | 525/87 |
| 4,169,869 | 10/1979 | Milenius | 525/87 |
| 4,226,953 | 10/1980 | Coran et al. | 525/193 |

FOREIGN PATENT DOCUMENTS 2061975 5/1981 United Kingdom .

*Primary Examiner*—Allan M. Lieberman
*Attorney, Agent, or Firm*—Emily A. Richeson; Richard J. Schlott

[57] ABSTRACT

Compositions comprising a vinyl aromatic compound-acrylonitrile copolymer, a nitrile rubber and a graft copolymer thereof possess good rubbery characteristics and are processible as thermoplastics with low mold shrinkage.

4 Claims, No Drawings

THERMOPLASTIC COMPOSITIONS CONTAINING NITRILE RUBBER

BACKGROUND OF THE INVENTION

This invention relates to improved thermoplastic compostions based on a vinyl aromatic compound-acrylo-nitrile copolymer and nitrile rubber. These compositions possess improved abrasion resistance and improved resistance to permanent deformation when subjected to tension or compression.

Copolymers of a 1,3-diene and acrylonitrile (generally referred to as nitrile rubber or NBR) are amorphous rubbers characterized by good oil, solvent and chemical resistance. Nitrile rubbers based on 1,3-butadiene and acrylonitrile are manufactured by the process of emulsion polymerization and are available commercially with acrylonitrile contents ranging from 20 to 50%. Nitrile rubbers generally exhibit poor mechanical properties until properly vulcanized, which is readily accomplished with vulcanizing agents commonly used in rubber processing including elemental sulfur, sulfur donors and organic peroxides. Nitrile rubbers are thus generally cross-linked during fabrication and are not normally reprocessible using thermoplastic equipment and methods of fabrication.

Copolymers of a vinyl aromatic compound and acrylonitrile such as, for example, styrene-acrylonitrile copolymers (SAN), are amorphous, rigid, thermoplastic materials. Molding compositions comprising SAN blended with NBR have also long been known for use as impact modified thermoplastics. Tough, thermoplastic compostions resistant to boiling water may be produced by melt mixing SAN and NBR in the presence of sulfur or other curing agents. The softening point of these blends is increased by curing the rubber component during blending to a soft vulcanized state, as described in U.S. Pat. No. 2,439,202. Processing difficulties can be overcome by increasing the toluene insoluble gel of the NBR to 30-50% prior to blending with the SAN resin, according to U.S. Pat. No. 2,550,139.

Most of the prior art SAN-NBR blends comprise lower levels of NBR, and are generally tough, impact resistant polymers lacking the resilience and elastic characteristics of rubber. SAN/NBR blends with increased rubber content provide extruded or injection molded products with poor tear strength and low elongation due to gross phase separation during processing. Grafting of SAN on NBR improves interfacial adhesion and reduces phase segregation during extrusion or injection molding. However, at high rubber contents (SAN/NBR ratios of 0.5/1, or less), the grafts exhibit objectionable melt elasticity and mold shrinkage; that is, the molded objects do not retain the shape of the mold but undergo substantial distortion. These graft copolymers are thus generally unsuitable for use as thermoplastic elastomers.

Thermoplastic compositions having elastomeric properties were more recently disclosed in U.S. Pat. No. 4,226,953. These elastomers, which comprise blends of SAN and nitrile rubber of high gel content (80% or more) are prepared by masticating the blend to advance the gel content of the NBR and form small particles of cured rubber dispersed in the thermoplastic SAN phase. This method suffers the disadvantage that the properties of the resulting products may vary significantly depending upon mixing time and temperature, shear rate, degree of dispersion and size of the rubber particles.

A truly thermoplastic molding composition comprising SAN and NBR which is readily processible by extrusion or injection molding and combines solvent resistance with good resilience and abrasion resistance would thus be a useful advance in the art.

SUMMARY OF THE INVENTION

This invention relates to thermoplastic compositions comprising a vinyl aromatic compound-acrylonitrile copolymer; a first nitrile rubber; and a graft copolymer obtained by the polymerization of a vinyl aromatic compound and acrylonitrile in the presence of a second nitrile rubber. More particularly, the present invention relates to compositions of the aforesaid type which possess improved thermoplastic flow, resilience and abrasion resistance, and to a method for their preparation.

DESCRIPTION OF THE INVENTION

The thermoplastic compositions of this invention comprise (A) a vinyl aromatic compound/acrylonitrile copolymer; (B) a first nitrile rubber; and (C) a graft copolymer consisting of a second nitrile rubber as the substrate and a vinyl aromatic compound/acrylonitrile copolymer as the grafted phase.

A. Vinyl aromatic compound-acrylonitrile copolymer

Suitable thermoplastic resins useful as blend constituents include vinyl aromatic monomers such as styrene, vinyl toluene, alpha-methylstyrene and mixtures therof, in combination with acrylonitrile. Preferably, the thermoplastic resin is a styrene-acrylonitrile copolymer (SAN resin). The proportion of styrene monomer in SAN may vary from 85 to 50 wt. % and, correspondingly, the proportion of acrylonitrile monomer may vary from 15 to 50 wt. %, however, resins containing 20-35 wt. % acrylonitrile are preferred. SAN resins are readily prepared by known processes, preferably, by emulsion polymerization as described in U.S. Pat. No. 2,140,048.

B. Nitrile Rubber

Suitable nitrile rubbers useful as the first nitrile rubber blend constituent may be any of the conventional random, non-crystalline copolymers of a 1,3-diene with acrylonitrile. Typically, such copolymers will comprise from 85 to 50% diene and from 15 to 50% acrylonitrile. The preferred nitrile rubbers are those prepared by emulsion polymerization and containing more than 40 wt. % 1,3-butadiene and, correspondingly, less than 40 wt % acrylonitrile, and most preferred are those containing less than about 30 wt % acrylonitrile.

C. Graft of a vinyl aromatic compound-acrylonitrile copolymer on a second nitrile rubber Nitrile rubbers useful as substrates for grafting are of the same type as the diene-acrylonitrile copolymers described above as blend constituents. They comprise from 85 to 50 wt % diene and from 15 to 50 wt % acrylonitrile. The nitrile rubbers preferred for such use are those prepared by emulsion polymerization which contain more than 40 wt % 1,3-butadiene and, correspondingly, less than 40 wt % acrylonitrile. Most preferred are those containing less than 30 wt % acrylonitrile.

Suitable monomers useful as grafted phase are vinyl aromatic compounds, such as styrene, vinyl toluene, alphamethylstyrene, and mixtures therof, in combination with acrylonitrile. Preferably, the graft phase monomers are combinations of styrene and acrylonitrile. The proportion of styrene monomer may vary from 85 to 50 wt %, and, correspondingly, the proportion of acrylonitrile monomer may vary from 15 to 50 wt %. Monomer mixtures containing 20 to 35 wt % acrylonitrile are preferred.

The graft polymerization is preferably carried out by a conventional emulsion free-radical graft polymerization process, wherein the graft phase monomers are polymerized in the presence of a preformed latex of the substrate nitrile rubber, employing conventional free radical or redox polymerization catalysts such as cumene hydroperoxide, dicumyl peroxide or the like together with activators, or alkali metal persulfate initiator systems.

D. Combination of polymer constituents

The thermoplastic resin, nitrile rubber and graft copolymer are combined by latex blending or by melt mixing. The preferred method is direct mixing of the latices at the desired ratio (calculated on the basis of their solids content) followed by coagulation of the product. If melt mixing is employed, it is preferable to precombine the thermoplastic resin and the nitrile rubber prior to coagulation to form a blend of the two components, and to add the graft by melt mixing in a second step. Direct coagulation of the nitrile rubber latex is preferably to be avoided, in as much as the coagulated rubber is a gummy product, difficult to isolate by filtration and difficult to dry. Premixing the nitrile rubber with the thermoplastic resin in latex form, gives a fine precipitate upon coagulation that is readily filtered and dried. The proportion of the graft in the final product may vary from 10 to 50 wt %, however, compositions comprising 15 to 45 wt % of the graft are preferred.

The superior properties of the compositions of this invention are best illustrated by comparing the properties of a blend of the thermoplastic resin with the nitrile rubber; a graft of the thermoplastic resin with the nitrile rubber; and a combination of the graft with the blend. These are presented in the following examples (all ratios and percentages are by weight).

PREPARATION OF SAN-NBR BLENDS

Example 1

SAN Copolymers

An emulsion polymerization process was used to prepare SAN copolymers (styrene/acrylonitrile ratio=2.5/1) for use in the preparation of SAN/NBR blends. Potassium soap of tallow fatty acid (1135 g of a 15% aqueous solution) and water (22250 g) were charged to a 10 gallon reactor and heated to 70° C. A solution of sodium formaldehyde sulfoxilate (17 g), trisodium hydroxyethylenetriamine triacetic acid (2.0 g), and ferrous sulfate heptahydrate (0.68 g) in water (1135 g) was also charged. A monomer solution consisting of styrene (8104 g), acrylonitrile (3246 g) and t-dodecylmercaptan (45.4 g) was pumped into the reactor over a period of 60 minutes. At the same time, cumene hydroperoxide (29.4 g, 82% active) was also pumped into the reactor over a period of 70 minutes. After completing the addition, the reaction was continued for an additional hour. The SAN latex obtained had a solid content of 32.3%.

Example 2

NBR Rubber

The following emulsion polymerization process was used to prepare an NBR, for subsequent use in the preparation of SAN-NBR blends.

Potassium soap of tallow fatty acid (2780 g of a 10% aqueous solution), potassium persulfate (28 g), t-dodecyl mercaptan (69 g), water (16000 g), acrylonitrile (1734 g), and butadiene (6937 g) were charged to a 10 gallon pressure reactor. The mixture was heated to 40° C. and held at this temperature with stirring for 2 hours. At this point, an additional amount of acrylonitrile (579 g) was added gradually over a period of 6 hours, and the mixture was then held at this temperature for additional 2 hours. After cooling to ambient temperature, the NBR latex was drained from the reactor. The NBR obtained contained 24% acrylonitrile and had a Mooney viscosity (ML-4, 100° C.) of 76. The solids content of the latex was 33%.

Example 3

SAN/NBR Blends

A portion of the SAN latex of Example 1 (1990 g) was mixed for 5 minutes under stirring at ambient temperature with a portion of the NBR latex of Example 2 (4870 g) to give a SAN/NBR ratio=0.4/1 (wt/wt), based on latex solids. A portion of the latex was coagulated into an excess of water containing aluminum sulfate (35 g). The product obtained was centrifuged, washed and dried 16 hours at 70° C. under vacuum. Test specimens were injection molded on a Battenfeld 1 oz. injection molding machine, at a stock temperature of 350° F. using a ram pressure of 1200-1700 psi and a mold temperature of 100° F. Properties are shown in Table 1.

Example 4

Preparation of SAN/NBR Graft

A graft copolymer consisting of NBR as the substrate and SAN as the grafted phase was prepared substantially by the following procedure. A portion of the NBR latex of Example 1 (10,823 g) was diluted with water (4415 g). To this latex were added cerelose (8.57 g), a solution of tetrasodium-pyrophosphate (0.857 g) and ferrous sulfate heptahydrate (0.114 g) in water (100 g), and t-dodecylmercaptan (13.3 ml). The latex mixture was then charged to a 5 gallon flask equipped with stirrer and heated at 60° C. under nitrogen flow. A mixture of styrene and acrylonitrile (1428 g, styrene/acrylonitrile ratio=2.5/1) and cumene hydroperoxide (8.6 ml, 84% active) was pumped into the flask over a period of ½ hour. After 10 minutes pumping time, the temperature of the reaction mixture was raised to 74° C. over a period of 20 minutes, and, then held at 74° C. from 2¾ hours when the addition was complete. N,N-diethyl-hydroxylamine (25 ml) and an antioxidant emulsion (250 ml, 25% active) was added, and an aliquot portion of the latex was cooled to ambient temperature and coagulated with aqueous aluminum sulfate solution. The product obtained was isolated, injection molded, and tested as described in Example 3. Properties are shown in Table 1.

Examples 5-6

SAN/NBR Graft, SAN,NBR Blends

Three component blends of SAN, NBR and SAN/NBR graft copolymer were prepared substantially by the following procedure.

A portion of the latex of Example 4 was mixed with a portion of the latex of Example 3 for 5 minutes under stirring at ambient temperature. The volume of the latices was calculated on the basis of polymer solids content to give the desired blend/graft ratio. The product obtained was isolated, injection molded and tested as described in Example 3. Properties of test specimens (blend/graft ratios=80/20 and 60/40) are shown in Table 1.

TABLE I

| Ex. No. | 3 | 4 | 5 | 6 |
|---|---|---|---|---|
| Composition | | | | |
| SAN[(1)], wt % | 28.6 | 0 | 22.9 | 17.1 |
| NBR wt %[(1)] | 71.4 | 0 | 57.1 | 42.9 |
| Graft Compolymer wt % | 0 | 100 | 20 | 40 |
| Properties | | | | |
| Tensile str., psi (ASTM D412) | 980 | 930 | 880 | 820 |
| Elong, % (ASTM D412) | 40 | 190 | 90 | 120 |
| Mold Shr., % (ASTM D955) | <1 | 7 | <1 | <1 |
| Taber Abr. (mg/1000 cycles) | 361 | 461 | 287 | 300 |
| Compr. set, % (ASTM D395) | | | | |
| R.T. | 67 | 55 | 53 | 45 |
| 100° F. | 80 | 70 | 66 | 64 |

Note:
[(1)]Sytrene/acrylonitrile ratio in SAN = 2.5/1, % AN in NBR = 24%; SAN/NBR ratio = 0.4/1; See text The results of Table 1 show the improvements in properties resulting from the combination of SAN/NBR graft with a SAN/NBR blend. The graft/blend mixtures of this invention Examples 5 and 6, exhibit compression set and abrasion resistance which are superior to either the graft polymer, Example 4, or the blend of nitrile rubber and SAN, Example 3. The synergistic enhancement of compression set and abrasion resistance are quite unexpected and could not be anticipated from the properties of the straight graft or blend. Also unexpectedly, the low mold shrinkage and surface smoothness of the blend are retained at graft levels as high as 40 wt %. These compositions are processible as conventional thermoplastics and exhibit a desirable combination of mechanical properties and resistance to solvents. They are useful for the manufacture of rubbery articles such as hoses, gaskets and the like.

Many compositional variations are possible and will suggest themselves to those skilled in the art. For example, plasticizers, flame retardants, stabilizers, fillers or other reinforcements can be added. Stabilization with antioxidants is particularly desirable, due to the presence of ethylenic unsaturation in the NBR. All such variations are within the full scope of the appended claims.

What is claimed is:

1. A thermoplastic composition comprising:
   (A) from 10 to 50 parts by weight of a copolymer of from 85 to 50 wt % of a vinyl aromatic monomer and correspondingly from about 15 to 50 wt % acrylonitrile,
   (B) from 50 to 90 parts by weight of a first nitrile rubber, and
   (C) from 10 to 50 parts by weight of a graft copolymer prepared by graft polymerizing from 10 to 50 parts by weight of a mixture comprising from 85 to 15 wt % of a vinyl aromatic compound and correspondingly from 15 to 50 wt % acrylonitrile in the presence of 100 parts by weight of a second nitrile rubber,
   wherein said first and second nitrile rubbers are copolymers comprising from 15 to 50 wt % acrylonitrile and correspondingly from 85 to 50 wt % butadiene.

2. The composition of claim 1 wherein said first and second nitrile rubbers are copolymers comprising from 15 to 40 wt % acrylonitrile and correspondingly from 85 to 60 wt % of butadiene.

3. The composition of claim 1 wherein said vinyl aromatic compound is styrene.

4. The composition of claim 1 wherein said copolymer of a vinyl aromatic compound and acrylonitrile is a copolymer of from 80 to 65 wt % styrene and from 20 to 35 wt % acrylonitrile, and wherein said first and second nitrile rubbers are copolymers comprising from 20 to 35 wt % of acrylonitrile and correspondingly from 80 to 65 wt % 1,3-butadiene.

* * * * *